(12) United States Patent
Whinnery et al.

(10) Patent No.: US 9,081,649 B2
(45) Date of Patent: Jul. 14, 2015

(54) VEHICLE INCLUDING MOVABLE PARTITION AND CONTROLLER

(71) Applicant: Honda Motor Co., Ltd., Tokyo (JP)

(72) Inventors: Joseph P. W. Whinnery, Scotts Valley, CA (US); Wesley W. Kim, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 149 days.

(21) Appl. No.: 13/662,959

(22) Filed: Oct. 29, 2012

(65) Prior Publication Data

US 2014/0121907 A1    May 1, 2014

(51) Int. Cl.
*G06F 17/00* (2006.01)
*B60L 1/00* (2006.01)
*E05F 15/689* (2015.01)

(52) U.S. Cl.
CPC . *G06F 17/00* (2013.01); *B60L 1/00* (2013.01); *E05F 15/689* (2015.01); *E05Y 2400/336* (2013.01); *E05Y 2900/55* (2013.01); *H02P 2203/03* (2013.01)

(58) Field of Classification Search
CPC .... G06F 17/00; E05F 15/0008; E05F 15/689; B60J 1/00; B60J 5/06; B60J 7/00; E05Y 2400/336; E05Y 2900/55; H02P 2203/03; B60L 1/00
USPC .......................................................... 701/49
See application file for complete search history.

(56) References Cited

U.S. PATENT DOCUMENTS

| | | | |
|---|---|---|---|
| 5,682,090 A | 10/1997 | Shigematsu et al. | |
| 5,990,646 A | 11/1999 | Kovach et al. | |
| 6,755,414 B2 * | 6/2004 | Iwai et al. | 271/176 |
| 7,800,332 B2 * | 9/2010 | Whinnery | 318/466 |
| 2002/0157313 A1 | 10/2002 | Fukazawa et al. | |
| 2006/0254148 A1 | 11/2006 | Noro et al. | |
| 2007/0244609 A1 * | 10/2007 | Kinoshita et al. | 701/22 |
| 2009/0058347 A1 | 3/2009 | Whinnery | |
| 2014/0001815 A1 * | 1/2014 | Tanaka et al. | 297/463.1 |

FOREIGN PATENT DOCUMENTS

WO    WO 2012124674 A1 *  9/2012

* cited by examiner

*Primary Examiner* — John Q Nguyen
*Assistant Examiner* — Nadeem Odeh
(74) *Attorney, Agent, or Firm* — Ulmer & Berne LLP

(57) ABSTRACT

A vehicle includes a motor, a movable partition, a controller, a sensor, and a power source. The movable partition is operably coupled with the motor. The controller is associated with the movable partition and is configured to detect a resting position of the movable partition. The sensor is coupled with the controller and is configured to detect a vehicular condition. The power source is in electrical communication with the motor and the controller and is configured to facilitate passage of electrical current to each of the controller and the motor. Passage of electrical current to the motor facilitates movement of the movable partition. If passage of electrical current to the motor is interrupted, the controller is configured to detect the resting position of the movable partition after passage of a delay time. The delay time changes in response to changes in the vehicular condition.

19 Claims, 10 Drawing Sheets

VEHICLE INCLUDING MOVABLE PARTITION AND CONTROLLER

TECHNICAL FIELD

Vehicles are provided which include a movable partition that is powered by a controller and is associated with a controller. The controller is configured to detect the resting position of the movable partition after passage of a delay time.

BACKGROUND

Known vehicles include a movable partition, such as those having a side window, moon roof, or sliding door. A motor is coupled with the movable partition to facilitate powered operation of the movable partition. Operation of the motor is controlled through actuation of a selector that is coupled with a controller. The controller detects the position of the selector and accordingly controls actuation of the motor. For example, if the selector is moved to a close-initiate position, the controller operates the motor to move the movable partition towards a closed position. Similarly, if the selector is moved to an open-initiate position, the controller operates the motor to move the movable partition towards an opened position.

Each time the motor comes to rest, the controller records the motor's final position (e.g., to memory) for later use (e.g., when the motor is subsequently operated). As is common, electrical current from a vehicular power source, such as a battery, facilitates operation of the motor. When the electrical current to the motor is interrupted to stop the motor, the motor continues to move momentarily (e.g., due to inertia or motor wind-down) before coming to rest. Therefore, once electrical current to the motor is interrupted, the controller is configured such that the motor's final position is detected after a predetermined delay time.

The amount of time from when electrical current to the motor is interrupted to when the motor comes to rest (e.g., the motor stoppage time) varies with certain vehicular conditions. For example, during cooler ambient temperatures, the motor stoppage time can be shorter than during warmer ambient temperatures. The delay time of the controller, however, is predetermined to account for the worst-case motor stoppage time for a particular vehicular condition. However, when the motor stoppage times are not "worst-case", the delay time of the controller can be excessive thereby wasting processing time and further delaying pending (e.g., queued) controller operations.

The controller can also be powered from the vehicular power source. When the electrical current to both the controller and motor is interrupted (e.g., when the vehicle is turned off, during low battery voltage, or during battery failure), the controller may need to remain powered long enough to record the final resting position of the motor. Typically, a supplemental power source, such as an electrolytic capacitor can power the controller when electrical current from the vehicular battery source is interrupted. However, performance of these supplemental power sources can be also affected by vehicular conditions. Conventionally, these supplemental power sources have been oversized to account for powering the controller during worst-case motor stoppage times (e.g., due to extreme vehicular conditions). These oversized supplemental power sources can be bulky, expensive and difficult to incorporate into controller packages.

SUMMARY

In accordance with one embodiment, a vehicle comprises a motor, a movable partition, a controller, a sensor, and a power source. The movable partition is operably coupled with the motor. The controller is associated with the movable partition and is configured to detect a resting position of the movable partition. The sensor is coupled with the controller and is configured to detect a vehicular condition. The power source is in electrical communication with the motor and the controller and is configured to facilitate passage of electrical current to each of the controller and the motor. Passage of electrical current to the motor facilitates movement of the movable partition. If passage of electrical current to the motor is interrupted, the controller is configured to detect the resting position of the movable partition after passage of a delay time. The delay time changes in response to changes in the vehicular condition.

In accordance with another embodiment, a method for operating a movable partition that is coupled with a motor comprises passing electrical current from a power source to the motor to facilitate movement of the movable partition. The method further comprises interrupting passage of the electrical current from the power source to the motor and detecting a vehicular condition. The method additionally comprises determining a delay time according to the detected vehicular condition and awaiting passage of the delay time. The method still further comprises, after passage of the delay time, detecting a resting position of the movable partition.

In accordance with yet another embodiment, a vehicle comprises a motor, a movable partition, a controller, a temperature sensor, a power source, and a supplemental power source. The movable partition is operably coupled with the motor. The controller is associated with the movable partition and is configured to detect a resting position of the movable partition. The temperature sensor is coupled with the controller and is configured to detect ambient temperature. The power source is in electrical communication with the motor and the controller and is configured to facilitate passage of electrical current to each of the controller and the motor. The supplemental power source is in electrical communication with the controller. Passage of electrical current to the motor facilitates movement of the movable partition. If passage of electrical current from the power source to the controller and the motor is interrupted, the supplemental power source is configured to provide electrical current to the controller. If passage of electrical current to the motor is interrupted, the controller is configured to detect the resting position of the movable partition after passage of a delay time. The delay time changes in response to changes in the vehicular condition.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
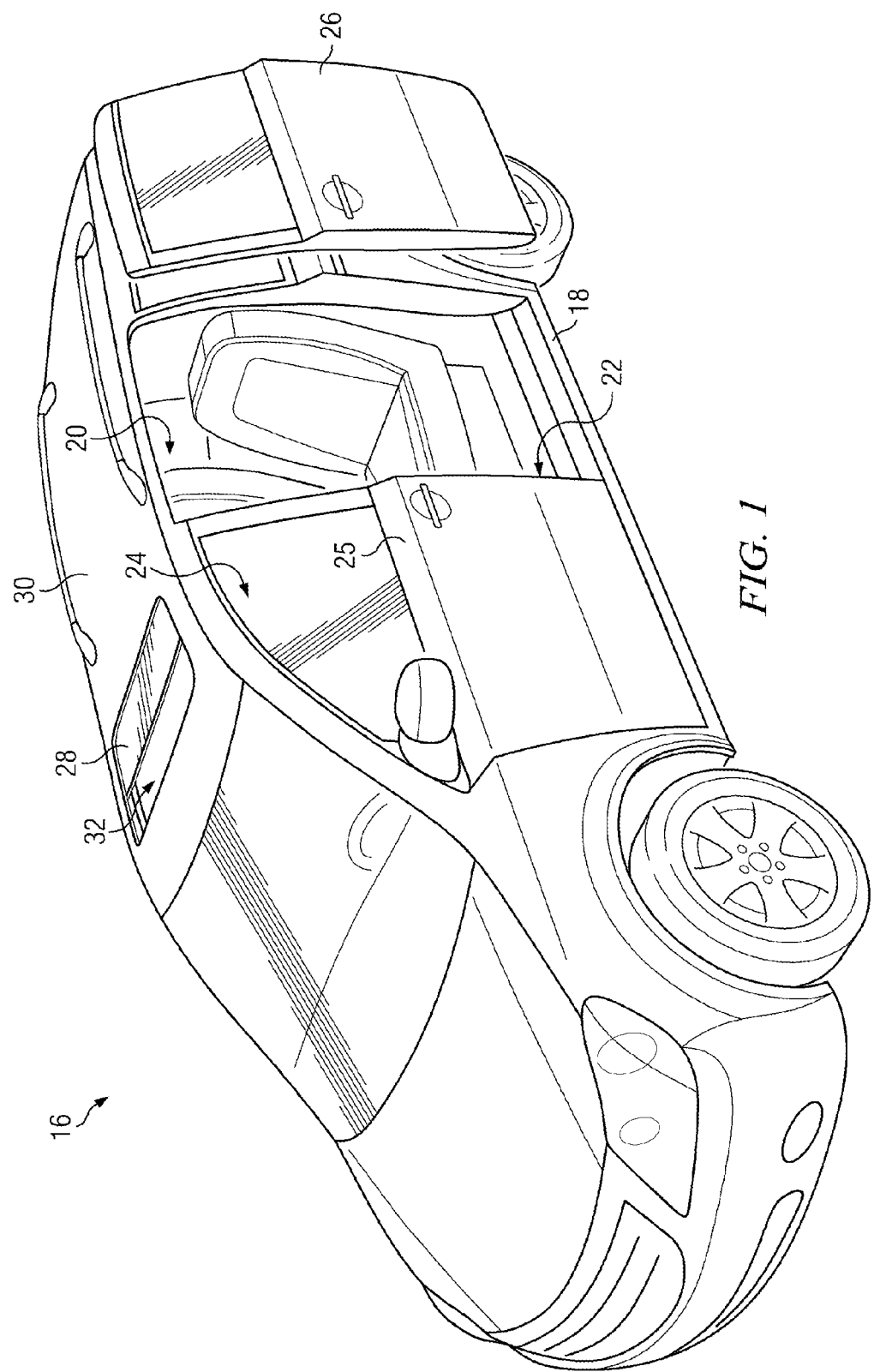
FIG. 1 is a front perspective view depicting a vehicle in accordance with one embodiment.

In connection with the views and examples of FIGS. 1-13, wherein like numbers indicate the same or corresponding elements throughout the views, FIG. 1 illustrates a vehicle 16. The vehicle 16 is shown in FIG. 1 to comprise a van. However, a vehicle in accordance with alternative embodiments can comprise an automobile, a truck, a recreational vehicle, an all terrain vehicle, agricultural equipment, or construction equipment, for example.

The vehicle 16 is shown in FIG. 1 to comprise a body structure 18 that defines a passenger compartment 20. In one embodiment, the body structure 18 can comprise a unibody-type structure. In other embodiments, a body structure can comprise multiple body panels that are coupled with an underlying frame structure. The vehicle 16 can include a front door 22 that is movably coupled to the body structure 18 to facilitate ingress to and egress from a front portion of the passenger compartment 20. The front door 22 can include a window 24 that is slidable with respect to a door frame 25. In one embodiment, the front door can be hingedly coupled to the body structure 18. Although the front door 22 is shown in FIG. 1 to include a left front door, it will be appreciated that a vehicle can additionally or alternatively include a right front door.

The vehicle 16 can include a side rear door 26 that is movably coupled to the body structure 18 to facilitate ingress to and egress from a central portion of the passenger compartment 20. In one embodiment, the side rear door 26 can be slidably coupled with the body structure 18. Although the side rear door 26 is shown in FIG. 1 to be a left side rear door, it will be appreciated that a vehicle can additionally or alternatively include a right side rear door or may not include any side rear doors. The vehicle 16 can also include a roof panel 28 that is selectively movable with respect to a roof portion 30 of the body structure 18 to reveal an opening 32. The roof panel 28 is shown in FIG. 1 to be configured as a moonroof. However, it will be appreciated that a roof panel can include any of a variety of suitable alternative arrangements (e.g., a sunroof or a multi-paneled panoramic roof). Although a window, side rear door, and roof panel are described above and shown in FIG. 1, it will be appreciated that a vehicle can additionally or alternatively include any of a variety of suitable alternative movable partitions.

Figure 2:
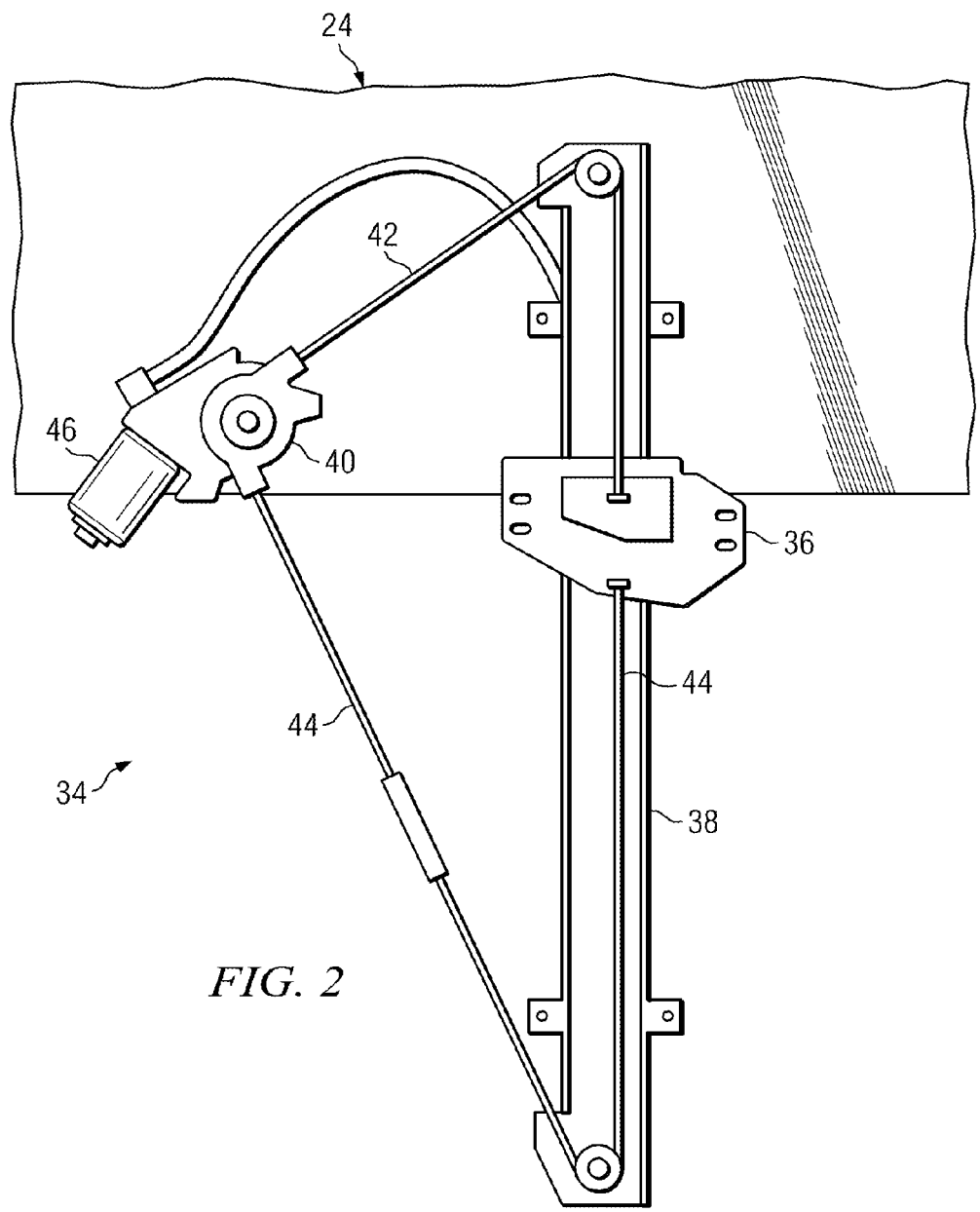
FIG. 2 is an enlarged side view of a window regulator assembly and window of the vehicle of FIG. 1 with certain components of the vehicle removed for clarity of illustration.

In one embodiment, the front door 22 can include a window regulator assembly 34 that movably supports the window 24, as illustrated in FIG. 2. The window regulator assembly 34 can include a window bracket 36 slidably engaged with a guide rail 38. The window bracket 36 can be coupled with the window 24 (e.g., with adhesive, such as epoxy). The window bracket 36 can also be coupled with an upper cable 42 and a lower cable 44 of a winder 40. The upper cable 42 can be attached to an upper portion of the window bracket 36 and the lower cable 44 can be attached to a lower portion of the window bracket 36. The upper and lower cables 42, 44 can be attached to a spool (not shown) of the winder 40. The spool can be rotated to move the window bracket 36 and window 24 along the guide rail 38 such that the window 24 can be moved between a fully closed position (shown in FIG. 3) and a fully opened position (shown in FIG. 4). For example, if the spool is rotated in one direction (e.g., counterclockwise), the upper and lower cables 42, 44 can cooperate to move the window 24 upwardly towards the fully closed position. In another example, if the spool is operated in an opposite direction (e.g., clockwise), the upper and lower cables 42, 44 can cooperate to move the window 24 downwardly towards the fully opened position.

As illustrated in FIG. 2, the window regulator assembly 34 can include a motor 46. The motor 46 can be coupled with the winder 40 such that operation of the motor 46 operates the winder 40 to slide the window 24 upwardly or downwardly. In one embodiment, a motor shaft (e.g., 48 illustrated in FIG. 6) of the motor 46 can be coupled directly with the spool. In another embodiment, the motor shaft can be coupled indirectly with the spool (e.g., using a worm gear arrangement). It will be appreciated that a motor can be operably coupled with a window in any of a variety of suitable alternative arrangements.

Figure 5:
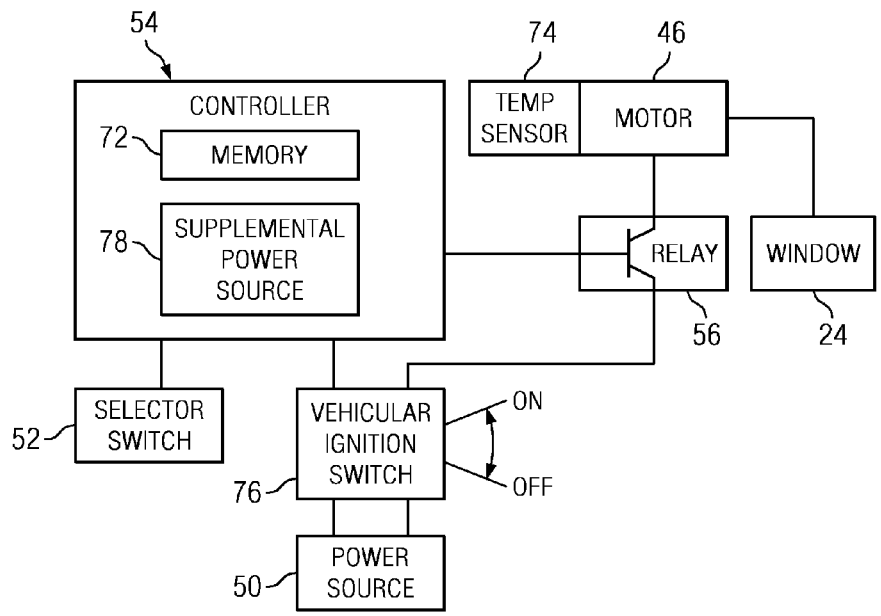
FIG. 5 is a schematic view depicting a controller associated with certain other electronic components that can cooperate to facilitate operation of the window, according to one embodiment.

As illustrated in FIG. 5, the motor 46 can be powered from a power source 50 that is in electrical communication with the motor 46. The power source 50 can include a vehicular battery (e.g., a lead-acid or lithium ion battery), an alternator, or any other device configured to facilitate passage of electrical current to the motor 46. A selector 52 can be in electrical communication with each of the motor 46 and the power source 50. The selector 52 can be configured to facilitate selective passage of electrical current from the power source 50 to the motor 46 to facilitate operation of the motor 46.

In one embodiment, the selector 52 can comprise a three-position switch (e.g., a rocker switch) that is movable between an up position, a down position, and a rest position. Movement of the selector 52 to the up position can operate the motor 46 to facilitate upward movement of the window 24. Movement of the selector 52 to the down position can operate the motor 46 to facilitate downward movement of the window 24. When the selector 52 is released from the up position or down position, it can automatically return to the rest position to inhibit further operation of the motor 46.

As illustrated in FIG. 5, the vehicle 16 can include a controller 54. The controller 54 can be in electrical communication with the power source 50 which can be configured to facilitate passage of electrical current to the controller 54 (e.g., to power the controller 54). In one embodiment, the selector 52 can be in electrical communication with the controller 54 which is operably coupled with a relay 56. When the selector 52 is operated, the controller 54 can operate the relay 56 to control operation of the motor 46 according to the position of the selector 52. For example, when an operator actuates the selector 52 to move the window 24 upwardly, the relay 56 can facilitate passage of electrical current to the motor 46 to move the window 24 upwardly. When the selector 52 is released, the relay 56 can interrupt the passage of electrical current to the motor 46 to stop further movement of the window 24.

Although the selector 52 is shown in FIG. 5 to control the motor 46 indirectly (e.g., through use of the controller 54), a selector can facilitate control over window position in any of a variety of suitable alternative arrangements. For example, a selector can be directly connected with each of the motor 46 and the power source 50 to control the motor 46 directly (e.g., without use of a controller).

Figure 3:
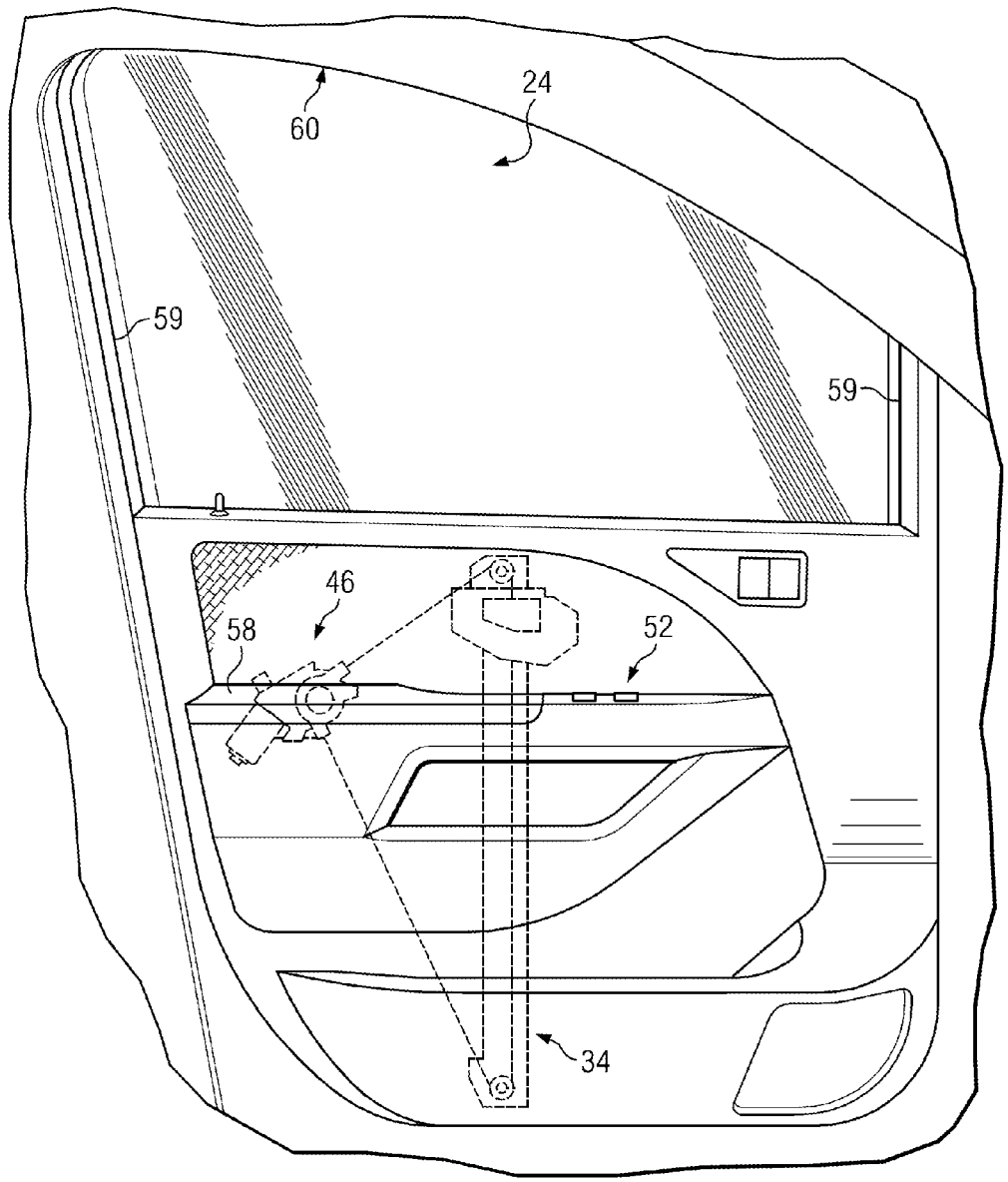
FIG. 3 is an enlarged side view of a front door of the vehicle of FIG. 1 with the window regulator of FIG. 2 disposed within an interior of the front door and with the window in a fully closed position.
Figure 4:
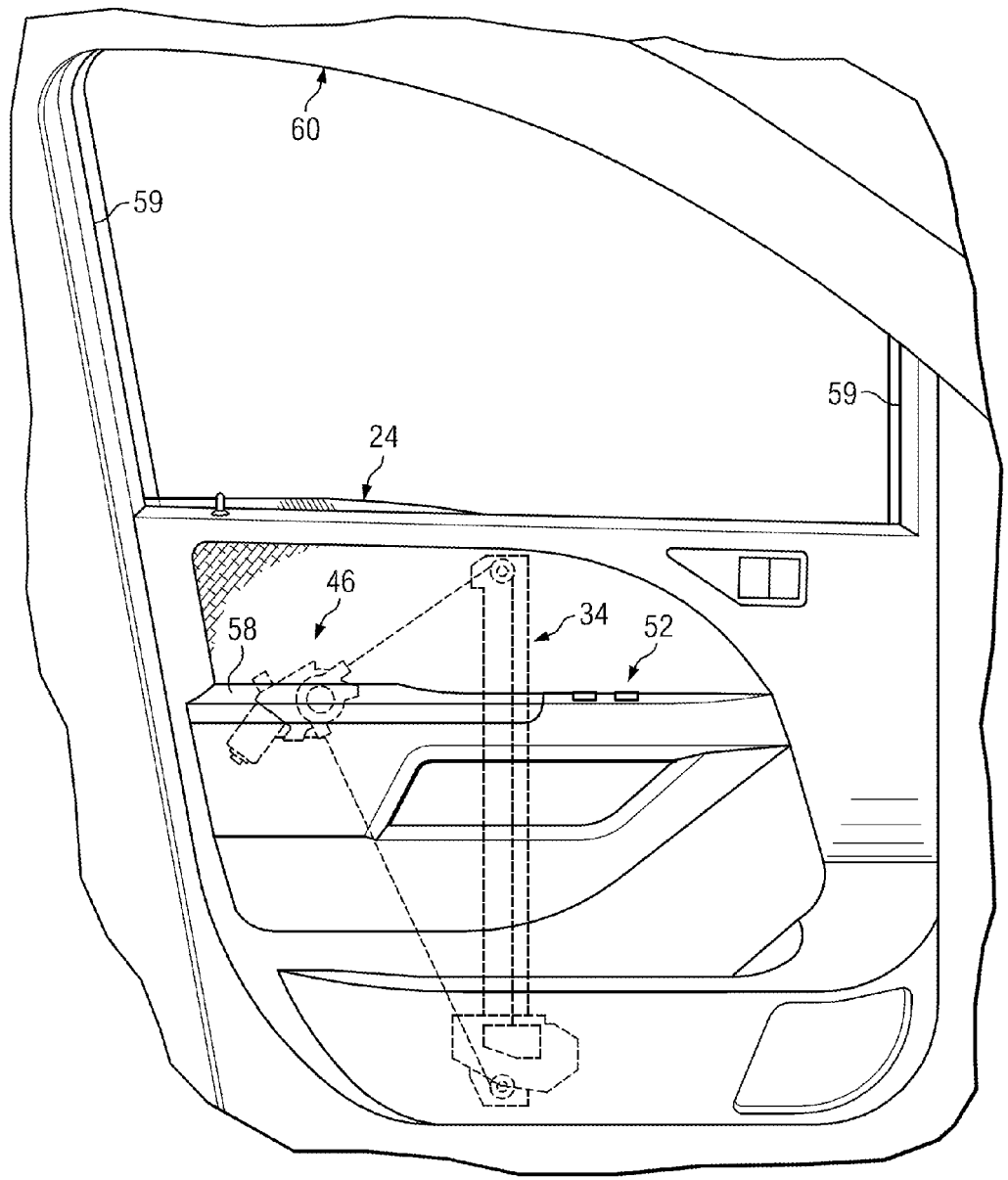
FIG. 4 is a side view similar to FIG. 3, but with the window in a fully opened position.

The selector 52 is shown in FIGS. 3 and 4 to be disposed along an armrest 58 of the front door 22 and within reach of a driver's left hand. However, it will be appreciated that a selector can be disposed in any of a variety of locations that facilitate operation of the selector by an operator. It will also be appreciated that any of a variety of suitable alternative selectors can be provided that facilitate operator control of a vehicular window. For example, the selector can comprise a pushbutton, a rotary switch, or toggle switch, a relay, solid state device, or any of a variety of other suitable devices or components. It will be appreciated that, with respect to a solid state device, a "position" of the selector can comprise a state of the solid state device.

It will be appreciated that, when the window 24 is operated, the controller 54 can detect the position of the window 24. In one embodiment, when the window 24 is moved downwardly, the controller 54 can detect the position of the window 24 to stop the window 24 once it reaches the fully opened position. The front door 22 can include window tracks 59 that facilitate guided movement of the window 24. The window tracks 59 can be disposed along a window opening of the front door 22, as shown in FIGS. 3 and 4. In order to ensure that the window 24 remains properly engaged with the window tracks 59 (and thus does not retract too far into the door frame 25), the controller 54 can be configured to stop downward movement of the window 24 at a lower limit. During operation, if the window 24 is moved downwardly (e.g., towards the opened position), the controller 54 can compare the position of the window 24 with the lower limit. Once the window 24 reaches the lower limit, the controller 54 can facilitate interruption of electrical current to the motor 46 to stop the window 24 from moving further in the downward direction.

In another embodiment, when the window 24 is moved upwardly, the controller 54 can detect the position of the window 24 to stop the window 24 once it reaches the fully closed position. For example, a window seal 60 is shown in FIGS. 3 and 4 to be disposed along the window opening of the front door 22. When the window 24 is in the fully closed position, the window seal 60 can interact with the window 24 to create a weather tight seal with the door frame (e.g., 25 in FIG. 1). The controller 54 can be configured to stop upward movement of the window 24 at an upper limit to ensure that the window 24 interacts properly with the window seal 60. During operation, if the window 24 is moved upwardly (e.g., towards the closed position), the controller 54 can compare the position of the window 24 with the upper limit. Once the window 24 reaches the upper limit, the controller 54 can facilitate interruption of electrical current to the motor 46 to stop the window 24 from moving further in the upward direction. In yet another embodiment, the controller 54 can be configured to detect the position of the window 24 to facilitate obstacle detection (e.g., a person's fingers).

Figure 6:
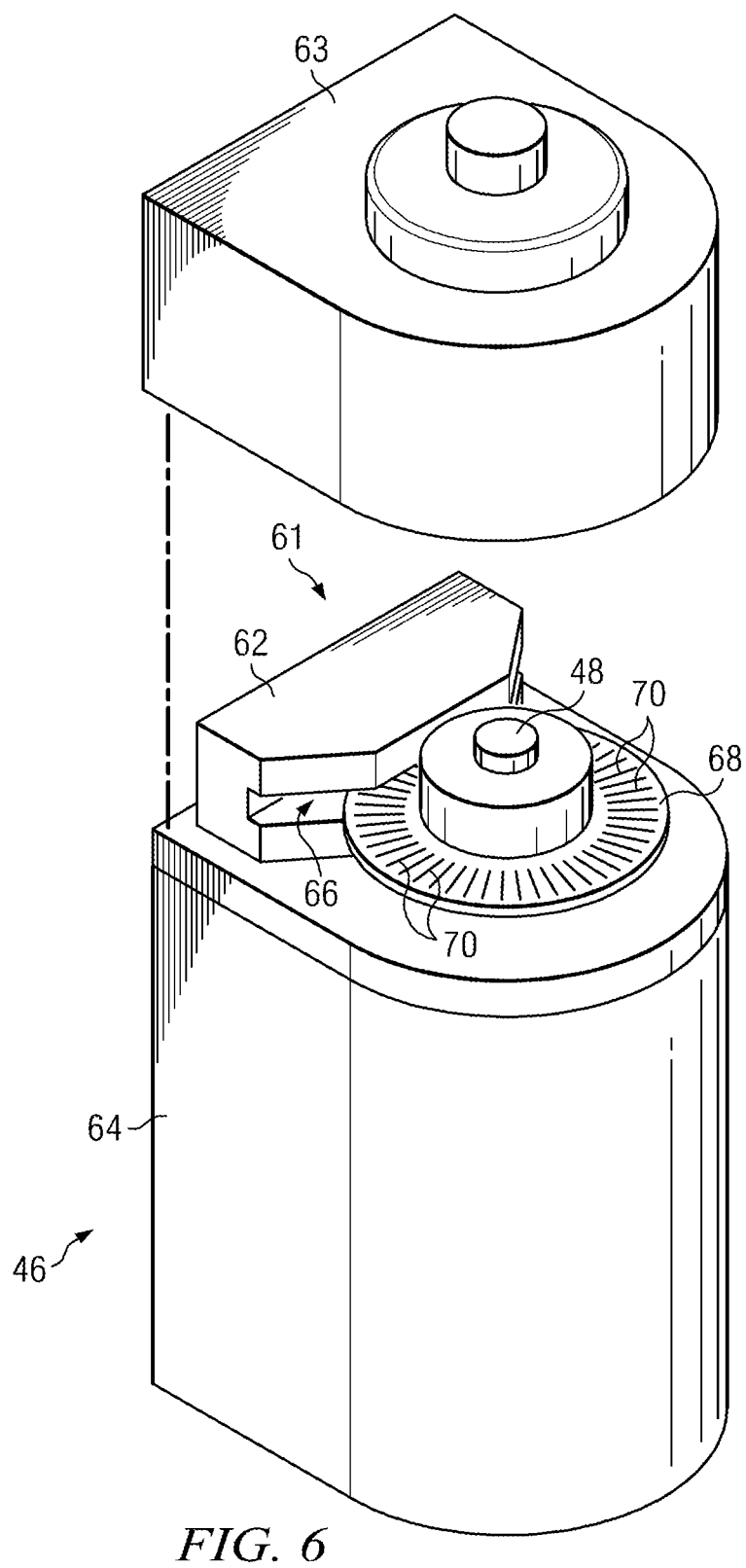
FIG. 6 is an exploded view of a motor of the window regulator assembly of FIGS. 2-4 with a lid of the motor removed to reveal an encoder.

In one embodiment, as illustrated in FIG. 6, the motor 46 can include an encoder 61 that is selectively concealed by a cap 63. The encoder 61 can be in electrical communication with the controller 54 to facilitate detection of the position of the window 24 by the controller 52. The encoder 61 can include a reader 62 that is supported by a housing 64 of the motor 46. The reader 62 can define a slot 66. An encoder disk 68 can be coupled with the motor shaft 48 such that a portion of the encoder disk 68 is disposed within the slot 66. Indicia 70 can be located on the encoder disk 68. When the window 24 is operated, rotation of the motor shaft 48 rotates the encoder disk 68 with respect to the slot 66. The controller 54 can monitor the number of revolutions of the encoder disk 68 to determine the distance that the window 24 has traveled. The controller 54 can also monitor the direction of the rotation of the encoder disk 68 to determine the direction that the window 24 is travelling. To detect the position of the window, the controller 54 can compare the distance and direction of travel of the window 24 with the initial position of the window 24 (e.g., a starting position). It will be appreciated that a position of a window can be detected in any of a variety of alternative arrangements that may or may not include monitoring of a motor shaft. For example, the window regulator assembly 34 can include an optical sensor that monitors a bottom edge of the window 24 to detect a position of the window 24.

In some embodiments, the starting position of the window 24 can be previous resting position of the window 24. Therefore, the controller 54 can be configured to store the previous resting position of the window 24 for use as the starting position of the window 24 for a subsequent operation of the window 24. As illustrated in FIG. 5, the controller 54 can include memory 72. When the window 24 comes to rest, the controller 54 can store the resting position of the window 24 to the memory 72. In one embodiment, the memory 72 can be non-volatile memory such as EEPROM. In such an embodiment, if power to the controller 54 is interrupted (e.g., due to power source 50 failure or vehicle 16 shut down), a previously stored resting position can remain in memory 72. Once power is restored to the controller 54, the controller 54 can easily locate the position of the window 24 by recalling the previously stored resting position of the window 24 from memory 72.

It will be appreciated that, following operation of the motor 46, if passage of electrical current to the motor 46 is interrupted (e.g., to stop the motor 46), the motor shaft 48 may continue to move before finally coming to rest (e.g., due to inertia or motor wind-down). Therefore, once the electrical current to the motor 46 is interrupted, the controller 54 can configured to detect the resting position of the window 24 after passage of a delay time. In one embodiment, to ensure that the motor shaft 48 is at rest so that the controller 54 can detect the resting position of the window 24, the delay time can be greater than the motor stoppage time (e.g., period of time that it takes the motor shaft 48 to come to rest after interruption of the electrical current to the motor 46). In such an embodiment, therefore, when electrical current to the motor 46 is interrupted, the controller 54 can be configured to detect the resting position of the window 24 after passage of the motor stoppage time has elapsed.

Figure 7:
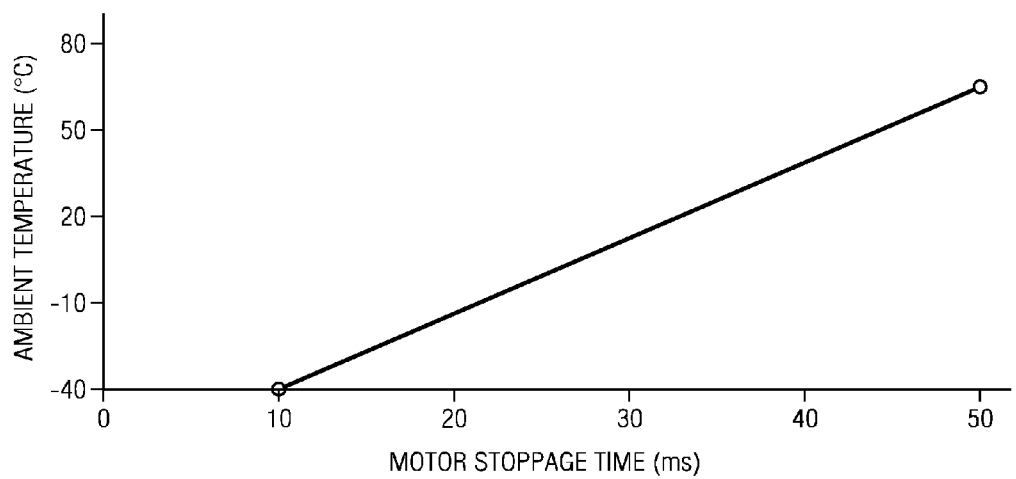
FIG. 7 is a graph depicting the relationship between motor stoppage time and ambient temperature according to one embodiment.

In one embodiment, the motor stoppage time can be affected by changes to ambient temperature. For example, a decrease in ambient temperatures can increase the load of the motor 46 which can accordingly reduce the motor stoppage time. Similarly, an increase in ambient temperature can decrease the load of the motor 46 which can accordingly increase the motor stoppage time. In one example, as illustrated by the graph of FIG. 7, during operation of the vehicle, the motor 46 can be subjected to ambient temperatures between about −40° C. and about 80° C. When the ambient temperature is about −40° C., the motor stoppage time can be about 10 ms. As indicated by the graph of FIG. 7, when the ambient temperature increases, the motor stoppage time can increase linearly with the ambient temperature such that when the ambient temperature reaches about 80° C., the motor stoppage time can be about 45 ms.

The controller 54 therefore can be configured to vary the delay time according to changes in ambient temperature. As the motor stoppage time changes with changes in ambient temperature, the delay time can be correspondingly changed to ensure that the motor shaft 48 comes to rest before the controller 54 detects the resting position of the window 24. Using the example shown in FIG. 7 and described above, when the ambient temperature is about −40° C., the delay time can be about 15 ms (e.g., greater than the 10 ms motor stoppage time). However, if the ambient temperature of the motor 46 increases to about 80° C., the delay time can be about 50 ms (e.g., greater than the 45 ms motor stoppage time). Thus, if the electrical current to the motor 46 is interrupted, the delay time of the controller 54 can be sufficient enough to detect the resting position of the window 24 for a given range of ambient temperatures.

In one embodiment, the controller 54 can be configured to detect the ambient temperature. For example, as illustrated in FIG. 5, a temperature sensor 74 can be associated with the motor 46 and configured to detect the ambient temperature of the motor 46. The temperature sensor 74 can be in electrical communication with the controller 54. The controller 54 can detect the ambient temperature from the temperature sensor 74 and using the detected ambient temperature, can determine an appropriate delay time. The temperature sensor 74 can be a thermocouple, for example, or any of a variety of other suitable alternative temperature sensor arrangements configured to detect ambient temperature.

In one embodiment, an ambient temperature/delay time lookup table can be stored in memory 72. The ambient temperature/delay time lookup table can be configured to associate ambient temperatures with delay times for the controller 54. In such an embodiment, the controller 54 can detect any ambient temperature and determine an appropriate delay time for the controller 54 from the lookup table. It will be appreciated, however, that, in lieu of a lookup table, the controller 54 can be configured to determine a delay time in any of a variety of suitable alternative arrangements. For example, a controller can be configured to calculate the delay time for a detected ambient temperature such as by utilizing a predefined algorithm, for example. In another example, a controller can be configured to utilize values from a lookup table to interpolate more precise delay times for a given ambient temperature. In yet another example, a controller can calculate a delay time by predicting the final position of the motor as disclosed in U.S. Patent Application Publication No. 2009/0058347, which is incorporated herein by reference.

It will be appreciated that any of a variety of other vehicular conditions can additionally or alternatively affect the motor stoppage time. In one embodiment, motor stoppage times can be affected by changes to motor operating voltage (e.g., power source overvoltage/undervoltage). For example, a decrease in motor operating voltage can decrease the operating speed of the motor 46 and reduce the motor stoppage time. Similarly, an increase in motor voltage can increase the operating speed of the motor 46 to increase the motor stoppage time. In such an embodiment, a voltage sensor can be associated with the motor 46 and configured to detect the voltage of the motor 46. The controller 54 can be in electrical communication with the voltage sensor to monitor the motor voltage of the motor 46 to determine an appropriate delay time for a given motor voltage.

It will be appreciated that tailoring the delay times of the controller 54 to a particular vehicular condition can improve the overall efficiency of the controller 54, and/or other devices that rely on operation of the controller 54. Thus, once the motor shaft 48 comes to rest, the resting position of the window 24 can be immediately (or substantially immediately) determined which can increase controller 54 responsiveness and/or reduce processor overhead. For example, when the controller 54 is coupled with a vehicular communication bus (such as a controller-area network bus), other devices that communicate with the communication bus may rely on the position of the window to perform an operation. Therefore, the less time that it takes for the controller 54 to detect the resting position of the window 24, the less time that other devices on the vehicular communication bus must wait to perform their operations. In another example, the controller 54 may dedicate processing time to detect the resting position of the motor shaft. Therefore, reducing the time that the controller 54 takes to detect the resting position of the window 24 can reduce processor overhead and thereby free up the processor to perform other processing operations.

It will be appreciated that passage of current from the power source 50 to both the motor 46 and the controller 54 can be interrupted. In one embodiment, the vehicle 16 can include a vehicular ignition switch 76, as illustrated in FIG. 5 that facilitates selective simultaneous interruption of the passage of electrical current from the power source 50 to each of the motor 46 and the controller 54. The vehicular ignition switch 76 can be configured for operation between an on position and an off position. When the vehicular ignition switch 76 in the on position, the controller 54 and the motor 46 can be powered from the power source 50. When the vehicular ignition switch 76 is moved to the off position, passage of electrical current from the power source 50 to the controller 54 and the motor 46 can be simultaneously interrupted. In such an embodiment, if the motor 46 was operating when the vehicular ignition switch 76 was moved to the off position, the power source 50 may not power the controller 54 long enough to detect the resting position of the motor shaft 48. It will be appreciated that passage of current from a power source to both a motor and a controller can be additionally or alternatively interrupted due to power source abnormalities (e.g., low-voltage, excessive current drain, failure) or any of a variety of other causes.

If the motor 46 is operating when the passage of current to the motor 46 and controller 54 is interrupted, the controller 54 may not remain powered from the power source 50 long enough to detect the resting position of the window 24. In one embodiment, as illustrated in FIG. 5, the controller 54 can include a supplemental power source 78. The supplemental power source 78 can be provided to facilitate passage of electrical current to the controller 54. When passage of electrical current from the power source 50 to each of the motor 46 and the controller 54 is interrupted, electrical current can be provided from the supplemental power source 78 to power the controller 54. In one embodiment, the supplemental power source 78 can be configured to power the controller 54 long enough to detect the resting position of the motor shaft 48 and to store the resting position of the window 24 to the memory 72. It will be appreciated that the supplemental power source 78 can include an electrolytic capacitor, a lithium-ion battery, or any of a variety of electronic components that can be configured to deliver current to the controller 54. It will also be appreciated that the supplemental power source 78 can be an onboard component of the controller 54 or can also be an external component such as would be plugged into an external controller port.

It will be appreciated that the performance of the supplemental power source 78 can also be affected by vehicular condition(s). For example, the supplemental power source 78 can be affected by changes in ambient temperature. In particular a decrease in ambient temperature can decrease the discharge capacity of the supplemental power source 78 (e.g., the length of time that the supplemental power source 78 can discharge power for a given current and voltage). Conventionally, a supplemental power source can be sized to provide sufficient power when the supplemental power source and motor are both performing under worst-case ambient temperatures. The worst-case scenarios for the supplemental power source and the motor, however, may not coincide such that the conventional supplemental power source can be sized to provide sufficient power at low ambient temperatures to power a controller long enough to detect the resting position of a motor operating at high ambient temperatures (e.g., for high motor stoppage times). For example, for an ambient temperature range of about −40° C. to 80° C., a conventional supplemental power source can be sized to supply enough current at an ambient temperature of about −40° to power a controller (once current to the motor is interrupted) long enough to detect a resting position of a motor at an ambient temperature of 80° C. Sizing the supplemental power source in this manner can ensure that the controller remains powered long enough to detect the resting position of a window for a wide range of ambient temperatures (e.g., as well as other vehicular conditions). However, as a result, the supplemental power source may be substantially oversized which can cause the controller 54, in some cases, to be powered long after the motor shaft 48 has reached its resting position.

By tailoring the delay times to a vehicular condition, the controller 54 can detect the resting position of the motor shaft 48 soon after the motor shaft 48 comes to rest. In such an arrangement, since the delay time more accurately reflects a motor stoppage time for a given condition, a supplemental power source may not need to be sized as conventional supplemental power sources. For example, the supplemental power source can be sized to power a controller long enough to withstand the delay time that is necessary for motor operation at high ambient temperatures (e.g., for high motor stoppage times). For example, for an ambient temperature range of about −40° C. to 80° C., a supplemental power source can be sized to supply enough current to power a controller (once current to the motor is interrupted) long enough to detect a resting position of a motor at an ambient temperature of 80° C. The supplemental power source can therefore be smaller, lighter and less expensive than conventional supplemental power sources.

Figure 8:
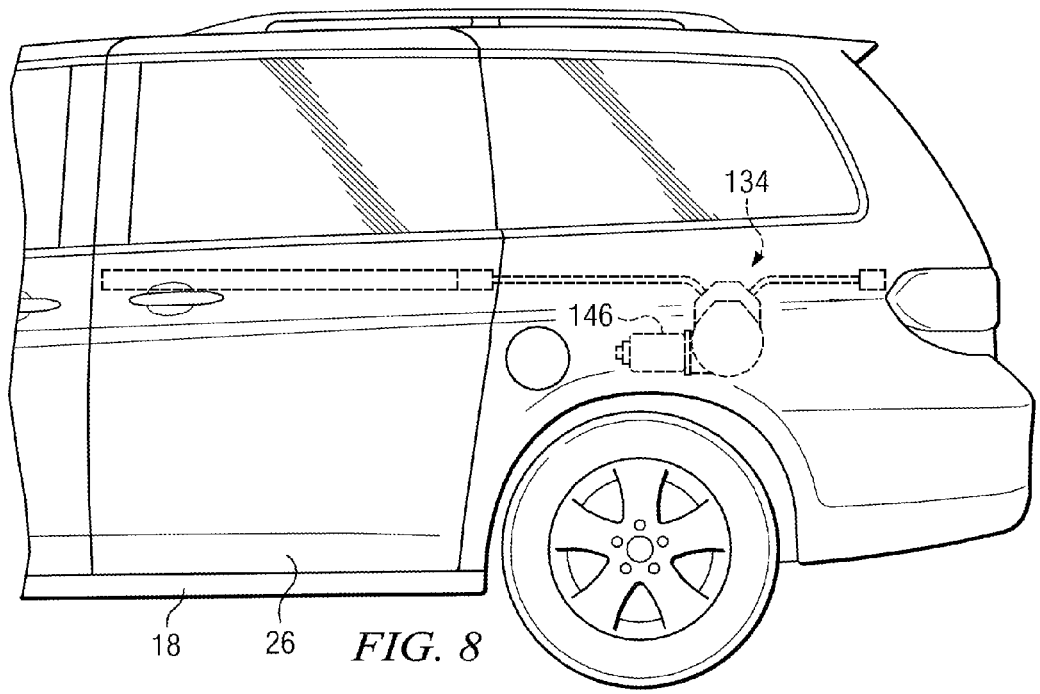
FIG. 8 is a side view of a left side of the vehicle of FIG. 1 depicting a regulator assembly disposed within a rear wall of the vehicle and a side rear door in a fully closed position.
Figure 9:
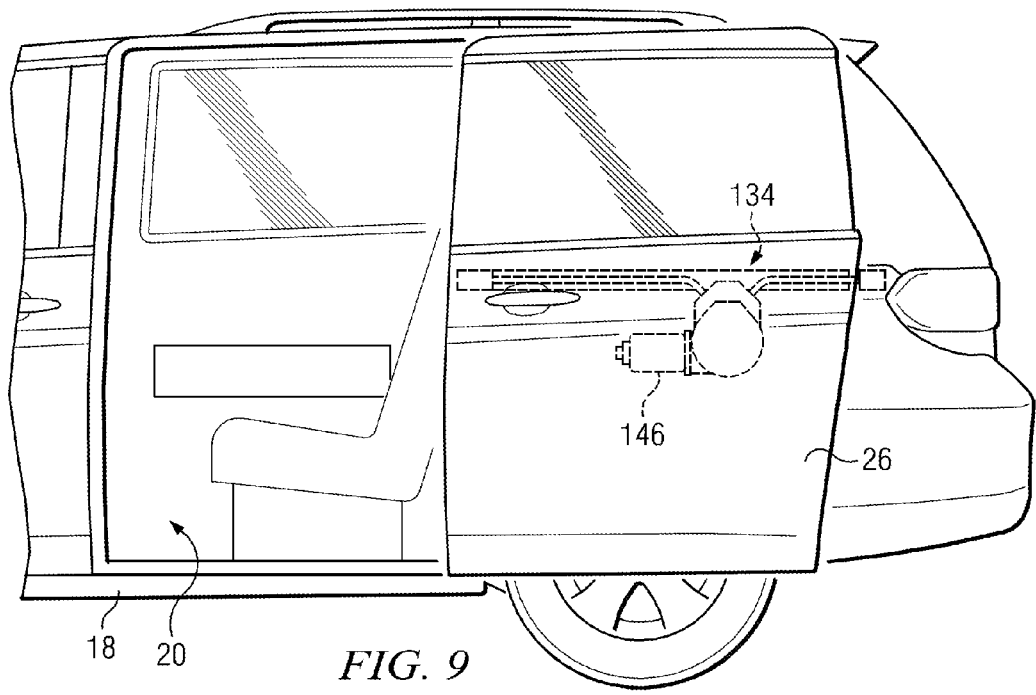
FIG. 9 is a side view similar to FIG. 8, but with the side rear door in a fully opened position.
Figure 10:
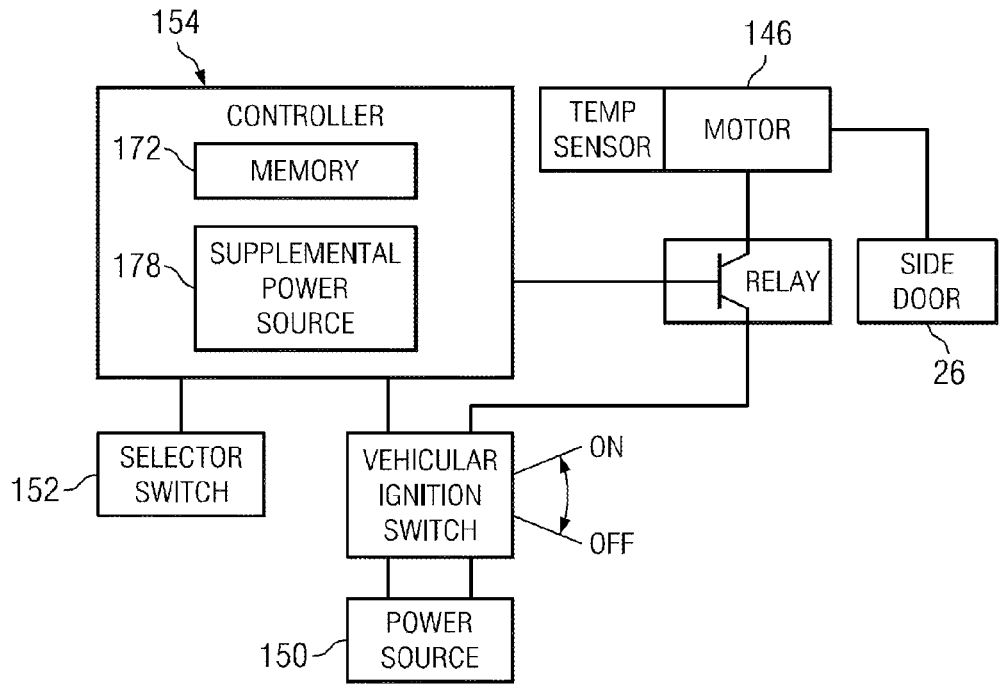
FIG. 10 is a schematic depicting a controller associated with certain other electronic components that can cooperate to facilitate operation of side rear door, according to one embodiment.

As illustrated in FIGS. 8-10, in an alternative embodiment, the side rear door 26 can be similar in many respects to the window 24 shown in FIGS. 2-7. For example, the side rear door 26 can include a regulator assembly 134 that movably supports the side rear door 26. The regulator assembly 134 can be operably coupled with the side rear door 26 such that the side rear door 26 can be moved between a fully closed position (shown in FIG. 8) and a fully opened position (shown in FIG. 9). The regulator assembly 134 can include a motor 146. The motor 146 can be coupled with the side rear door 26 (e.g., with cables) such that operation of the motor 146 operates the side rear door 26 between the opened and closed positions. As illustrated in FIG. 10, the motor 146 can be in electrical communication with a power source 150. A selector 152 can be in electrical communication with the motor 146 and can facilitate selective control over the operation of the side rear door 26.

A controller 154 can be in electrical communication with the power source 150. When the side rear door 26 is operated, the controller 154 can detect the position of the side rear door 26. When the side rear door 26 comes to rest, the controller 154 can also detect the resting position of the side rear door 26. The controller 154 can store the resting position of the side rear door 26 to memory 172. If power to the controller 154 is interrupted, a stored resting position can remain in the memory 172. Once power to the controller 154 is restored, the controller 154 can easily locate the position of the side rear door 26 by recalling the previously stored resting position from the memory 172. When electrical current to the motor 146 is interrupted, the controller 154 can be configured to detect the resting position of the side rear door 26 after passage of a delay time. The delay time of the controller 154 can change according to changes to certain vehicular conditions (e.g., ambient temperature). A supplemental power source 178 can be provided in electrical communication with the controller 154 such that the controller 154 can be selectively powered from the supplemental power source 178.

Figure 13:
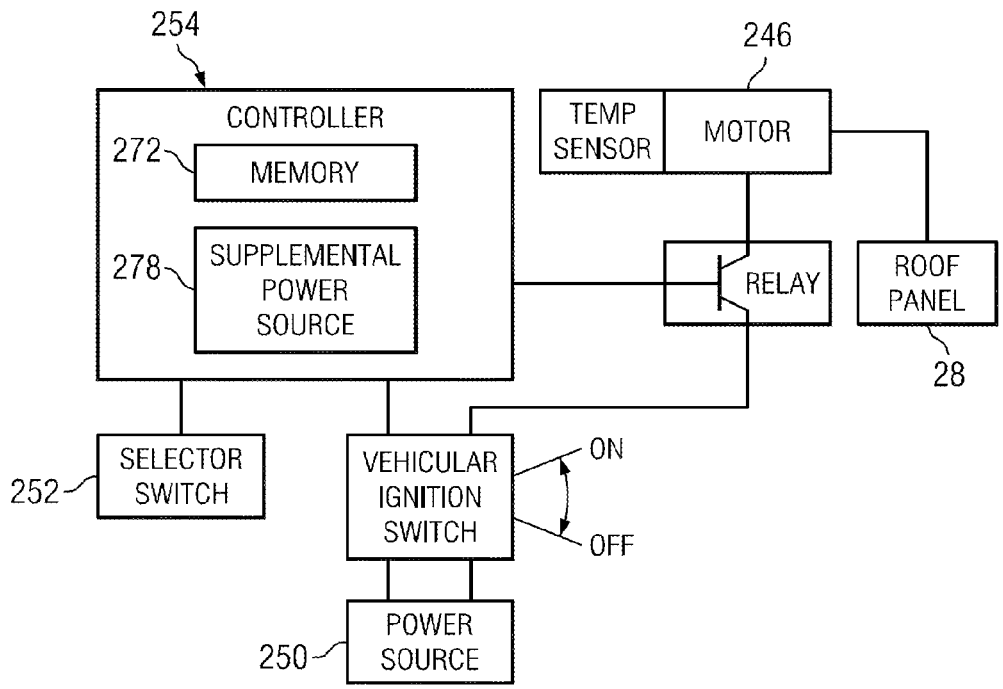
FIG. 13 is a schematic depicting a controller associated with certain other electronic components that can cooperate to facilitate operation of the roof panel, according to one embodiment.
Figure 11:
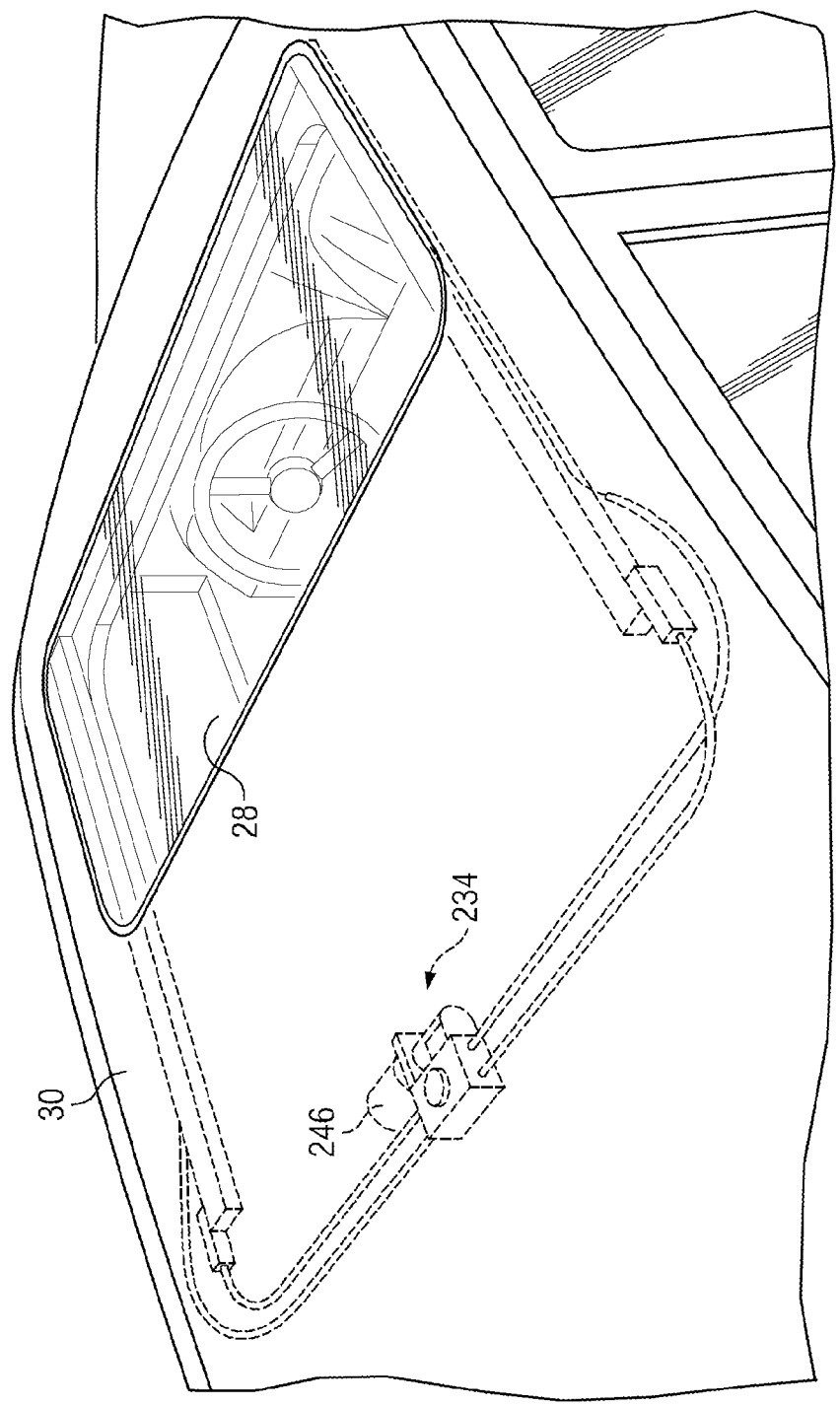
FIG. 11 is an upper right perspective view of a portion of a roof of the vehicle of FIG. 1 depicting a regulator assembly disposed within the roof and a roof panel in a fully closed position.
Figure 12:
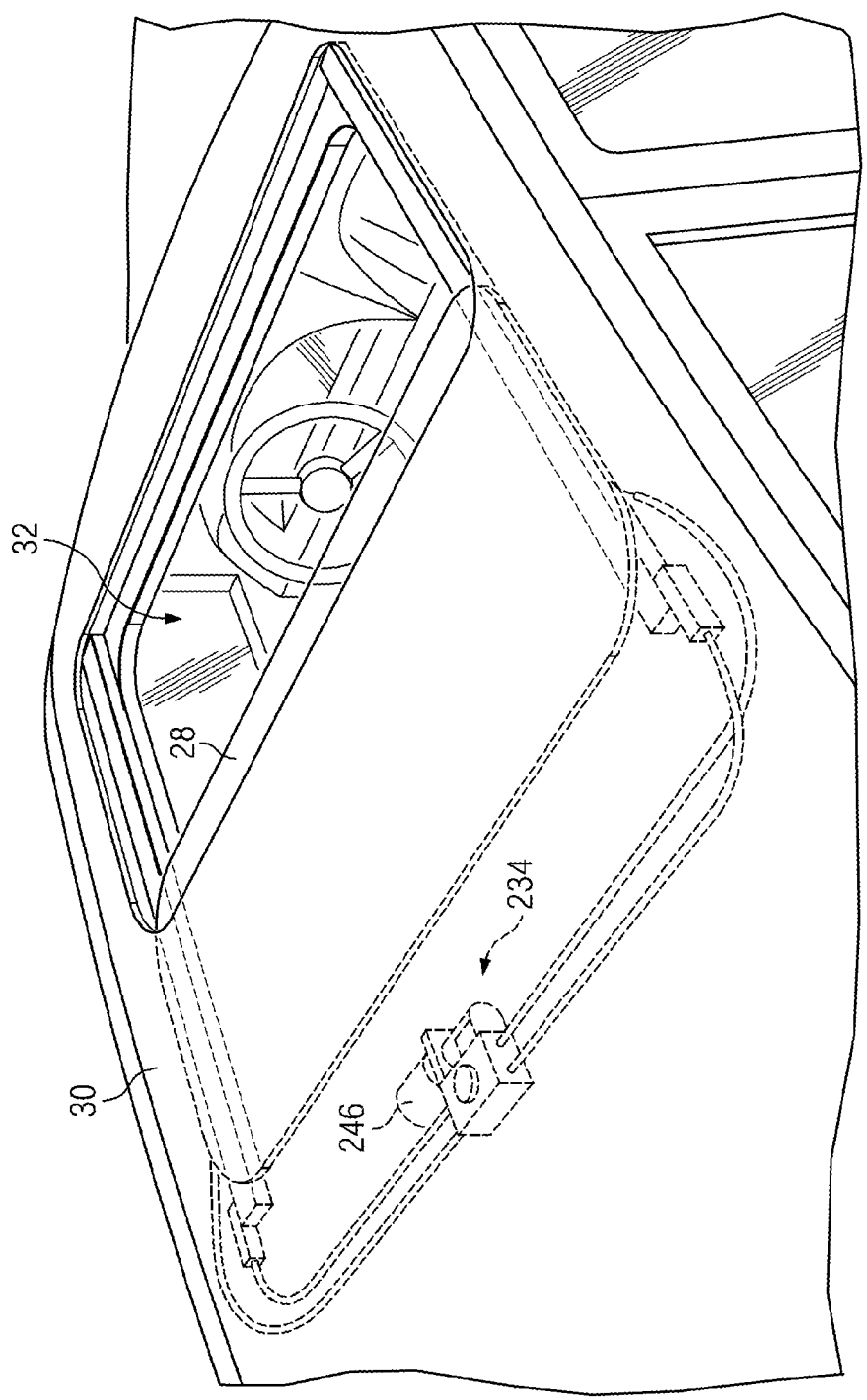
FIG. 12 is an upper right perspective view similar to FIG. 11, but with the roof panel in a fully opened position.

As illustrated in FIGS. 11-13, in an alternative embodiment, the roof panel 28 can be similar in many respects to the window 24 shown in FIGS. 2-7. For example, the roof panel 28 can include a regulator assembly 234 that movably supports the roof panel 28. The regulator assembly 234 can be operably coupled with the roof panel 28 such that the roof panel 28 can be moved between a fully closed position (shown in FIG. 11) and a fully opened position (shown in FIG. 12). The regulator assembly 234 can include a motor 246. The motor 246 can be coupled with the roof panel 28 such that operation of the motor 246 operates the roof panel 28 between the opened and closed positions. As illustrated in FIG. 13, the motor 246 can be in electrical communication with a power source 250. A selector 252 be in electrical communication with the motor 246 and can facilitate selective control over the operation of the roof panel 28.

A controller 254 can be in electrical communication with the power source 250. When the roof panel 28 is operated, the controller 254 can detect the position of the roof panel 28. When the roof panel 28 comes to rest, the controller 254 can also detect the resting position of the roof panel 28. The controller 254 can store the resting position of the roof panel 28 to memory 272. If power to the controller 254 is interrupted, the stored resting position of the roof panel 28 can remain in the memory 272. Once power to the controller 254 is restored, the controller 254 can easily locate the position of the roof panel 28 by recalling the previously stored resting position from the memory 272. When electrical current to the motor 246 is interrupted, the controller 254 can be configured to detect the resting position of the roof panel 28 after passage of a delay time. The delay time of the controller 254 can change according to changes in certain vehicular conditions (e.g., ambient temperature). A supplemental power source 278 can be provided in electrical communication with the controller 254 such that the controller 254 can be selectively powered from the supplemental power source 278.

It will be appreciated that a controller can be provided upon a vehicle in any of a variety of suitable locations and configurations. The controller can be a stand alone controller or can alternatively be integrated into a vehicular controller such as an electronic control unit (ECU), for example. It will also be appreciated that the controller can be configured to implement any of a variety of suitable control routines and/or functionalities.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:
   a motor;
   a movable partition operably coupled with the motor;
   a controller associated with the movable partition and configured to detect a resting position of the movable partition;
   a sensor coupled with the controller and configured to detect a vehicular condition; and
   a power source in electrical communication with the motor and the controller and configured to facilitate passage of electrical current to each of the controller and the motor; wherein:
      passage of electrical current to the motor facilitates movement of the movable partition;
      when passage of electrical current to the motor is interrupted, the controller is configured to detect the resting position of the movable partition after passage of a delay time from when the passage of the electrical current to the motor is interrupted; and
      the delay time changes in response to changes and is determined by the controller in the vehicular condition.

2. The vehicle of claim 1 wherein the movable partition comprises one of a vehicular window, a vehicular roof panel, and a vehicular door.

3. The vehicle of claim 1 further comprising a supplemental power source in electrical communication with the controller, wherein when passage of electrical current from the power source to the controller is interrupted, the supplemental power source is configured to provide electrical current to the controller.

4. The vehicle of claim 3 wherein the supplemental power source comprises at least one of an electrolytic capacitor and a lithium-ion battery.

5. The vehicle of claim 3 further comprising a vehicular ignition switch that is configured to facilitate selective simultaneous interruption of the passage of electrical current from the power source to the each of the controller and the motor.

6. The vehicle of claim 1 wherein the sensor comprises a temperature sensor and the vehicular condition comprises an ambient temperature.

7. The vehicle of claim 6 wherein a change in the ambient temperature causes a corresponding change in the delay time.

8. The vehicle of claim 1 wherein the motor comprises a motor shaft movably coupled with the movable partition and the controller is configured to monitor the motor shaft in order to detect the resting position of the movable partition.

9. The vehicle of claim 1 further comprising a selector in electrical communication with the power source and the motor, the selector being configured to facilitate selective passage of the electrical current from the power source to the motor.

10. The vehicle of claim 1 wherein the controller further comprises memory and is configured to save the resting position of the movable partition to the memory.

11. A method for operating a movable partition that is coupled with a motor, the movable partition and the motor being in a vehicle, the method comprising:
   passing electrical current, by a controller, from a power source to the motor to facilitate movement of the movable partition;
   interrupting passage of the electrical current, by the controller, from the power source to the motor;
   detecting a vehicular condition, by the controller;
   determining a delay time from when the passage of the electrical current to the motor is interrupted, by the controller, according to the detected vehicular condition;
   awaiting passage of the delay time, by the controller; and
   after passage of the delay time, detecting a resting position of the movable partition, by the controller.

12. The method of claim 11 wherein detecting a resting position of the movable partition comprises monitoring a motor shaft of the motor.

13. The method of claim 11 wherein the vehicular condition comprises at least one of an ambient temperature, an electrical load of the motor, a motor voltage, and a motor speed.

14. The method of claim 11 wherein the controller comprises a supplemental power source, the method further comprising:
   passing electrical current from the supplemental power source to the controller;
   interrupting passage of the electrical current from the power source to the controller and the motor; and
   powering the controller from the supplemental power source.

15. The method of claim 14 wherein the controller comprises memory, the method further comprising:
   recording the resting position of the movable partition to the memory; and
   retrieving the resting position of the movable partition from the memory prior to moving the movable partition.

16. The method of claim 11 wherein determining the delay time comprises comparing the vehicular condition to a predefined lookup table.

17. A vehicle comprising:
   a motor;
   a movable partition operably coupled with the motor;
   a controller associated with the movable partition and configured to detect a resting position of the movable partition;
   a temperature sensor coupled with the controller and configured to detect ambient temperature; and
   a power source in electrical communication with the motor and the controller and configured to facilitate passage of electrical current to each of the controller and the motor; and
   a supplemental power source in electrical communication with the controller;
   wherein:
      passage of electrical current to the motor facilitates movement of the movable partition;

when passage of electrical current from the power source to the controller and the motor is interrupted, the supplemental power source is configured to provide electrical current to the controller;

when passage of electrical current to the motor is interrupted, the controller is configured to detect the resting position of the movable partition after passage of a delay time from when the passage of the electrical current to the motor is interrupted; and the delay time changes and is determined by the controller in response to changes in the ambient temperature.

18. The vehicle of claim 17 wherein the movable partition comprises one of a vehicular window, a vehicular roof panel, and a vehicular door.

19. The vehicle of claim 17 further comprising a vehicular condition sensor configured to detect a vehicular condition.

* * * * *